(12) United States Patent
Min et al.

(10) Patent No.: US 10,471,924 B2
(45) Date of Patent: Nov. 12, 2019

(54) ROOF AIRBAG APPARATUS

(71) Applicant: HYUNDAI MOBIS CO., LTD., Seoul (KR)

(72) Inventors: Byung Ho Min, Seoul (KR); Kyu Sang Lee, Yongin-si (KR); Hae Kwon Park, Yongin-si (KR); Sang Won Hwangbo, Goyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 80 days.

(21) Appl. No.: 15/961,000

(22) Filed: Apr. 24, 2018

(65) Prior Publication Data

US 2018/0312130 A1     Nov. 1, 2018

(30) Foreign Application Priority Data

Apr. 26, 2017     (KR) .................. 10-2017-0053261

(51) Int. Cl.
  *B60R 21/233*     (2006.01)
  *B60R 21/214*     (2011.01)
  *B60R 21/13*      (2006.01)
  *B60R 21/231*     (2011.01)

(52) U.S. Cl.
  CPC .......... *B60R 21/233* (2013.01); *B60R 21/13* (2013.01); *B60R 21/214* (2013.01); *B60R 2021/23192* (2013.01)

(58) Field of Classification Search
  CPC ..... B60R 21/233; B60R 21/13; B60R 21/214; B60R 2021/23192
  See application file for complete search history.

(56) References Cited

U.S. PATENT DOCUMENTS

| | | | |
|---|---|---|---|
| 9,610,915 B2 * | 4/2017 | Specht | B60R 21/214 |
| 9,771,048 B2 * | 9/2017 | Min | B60R 21/214 |
| 9,994,182 B1 * | 6/2018 | Jaradi | B60R 21/214 |
| 2018/0162313 A1 * | 6/2018 | Lee | B60R 21/213 |
| 2018/0162314 A1 * | 6/2018 | Lee | B60R 21/2338 |
| 2018/0162315 A1 * | 6/2018 | Lee | B60R 21/2346 |
| 2018/0265029 A1 * | 9/2018 | Min | B60R 21/233 |
| 2019/0016292 A1 * | 1/2019 | Son | B60R 21/233 |
| 2019/0184930 A1 * | 6/2019 | Min | B60R 21/213 |

FOREIGN PATENT DOCUMENTS

| | | | | |
|---|---|---|---|---|
| JP | 2004249845 A | * | 9/2004 | |
| WO | WO-0224490 A1 | * | 3/2002 | .......... B60R 21/214 |

* cited by examiner

*Primary Examiner* — Faye M Fleming
(74) *Attorney, Agent, or Firm* — H.C. Park & Associates, PLC

(57) ABSTRACT

A roof airbag apparatus including: a leading deployment part connected to a diffuser; a trailing deployment part connected to the leading deployment part, and deployed with a time difference from the deployment of the leading deployment part; and an overlap deployment part connected to the trailing deployment part, overlapped by the trailing deployment part, and deployed with a time difference form the deployment of the trailing deployment part.

10 Claims, 10 Drawing Sheets

ROOF AIRBAG APPARATUS

CROSS-REFERENCE TO RELATED APPLICATION

This application claims priority from and the benefit of Korean Patent Application No. 10-2017-0053261, filed on Apr. 26, 2017, which is hereby incorporated by reference for all purposes as is set forth herein.

BACKGROUND

Field

Exemplary embodiments relate to a roof airbag apparatus, and more particularly, to a roof airbag apparatus capable of reducing bending deformation when the head of a passenger collides with a roof of a vehicle.

Discussion of the Background

In general, a vehicle has an airbag apparatus installed to protect a passenger. A roof airbag apparatus is installed in a panorama roof positioned at the ceiling of the vehicle. In case of a roll over of the vehicle, the roof airbag apparatus is expanded and deployed to prevent an injury or ejection of a driver or passenger.

In the conventional roof airbag apparatus, however, an airbag cushion part may be bent toward the ceiling of the vehicle by a collision with the head of a passenger, in case of a roll over of the vehicle. When the bending deformation of the airbag cushion part is increased, an ejection amount of the passenger may be increased, which makes it possible to raise the injury and ejection risks of the passenger.

The above information disclosed in this Background section is only for enhancement of understanding of the background of the invention and, therefore, it may contain information that does not constitute prior art.

SUMMARY

Exemplary embodiments of the present invention provide a roof airbag apparatus capable of reducing bending deformation when the head of a passenger collides.

Additional features of the invention will be set forth in the description which follows, and in part will be apparent from the description, or may be learned by practice of the invention.

An exemplary embodiment of the present invention provides a roof airbag apparatus including: a leading deployment part connected to a diffuser; a trailing deployment part connected to the leading deployment part, and configured to be deployed with a time difference from deployment of the leading deployment part; and an overlap deployment part connected to the trailing deployment part, overlapped by the trailing deployment part, and deployed with a time difference from the trailing deployment part.

The overlap deployment part may be fixed to the trailing deployment part through a first sewed part.

The overlap deployment part may have a greater width than the trailing deployment part, in order to cover both sides of a headliner of a vehicle.

The roof airbag apparatus may further include a support chamber connected to the trailing deployment part, formed inside the overlap deployment part so as to be separated from the overlap deployment part, and deployed toward the opposite side of the diffuser.

The support chamber may not communicate with the overlap deployment part, but does communicate with the trailing deployment part.

The support chamber may be deployed to cover a headliner of a vehicle.

The support chamber may be fixed to the overlap deployment part through a second sewed part, and the second sewed part may be torn by an expansion force of the support chamber when the support chamber is deployed.

The leading deployment part may include: first chambers coupled to the diffuser, and deployed toward both sides of the leading deployment part in the widthwise direction; second chambers disposed at both sides of the leading deployment part in the widthwise direction, and deployed from the first chamber toward the opposite side of the diffuser; third chambers disposed inside the second chambers, and deployed from the second chambers toward the diffuser; and a fourth chamber disposed between the third chambers, and deployed from the third chambers toward the opposite side of the diffuser.

The trailing deployment part may include: fifth chambers disposed at both sides of the trailing deployment part in the widthwise direction, and deployed from the fourth chamber toward both sides of the trailing deployment part in the widthwise direction; sixth chambers deployed from the fifth chambers toward the opposite side of the diffuser; a seventh chamber connected to the sixth chambers, disposed at the leading end of the trailing deployment part so as to be parallel to the widthwise direction of the trailing deployment part, and communicating with the support chamber; and an eighth chamber disposed inside the sixth chambers, and deployed from the seventh chamber toward the diffuser.

The diffuser may include: a barrier wall disposed at the rear of the vehicle so as to block gas from flowing toward the rear of the vehicle, the gas being supplied from the inflator; and gas discharge parts connected to both sides of the barrier wall, and extended in the widthwise direction of the vehicle so as to constitute a flow path of the gas.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be.

Figure 1:
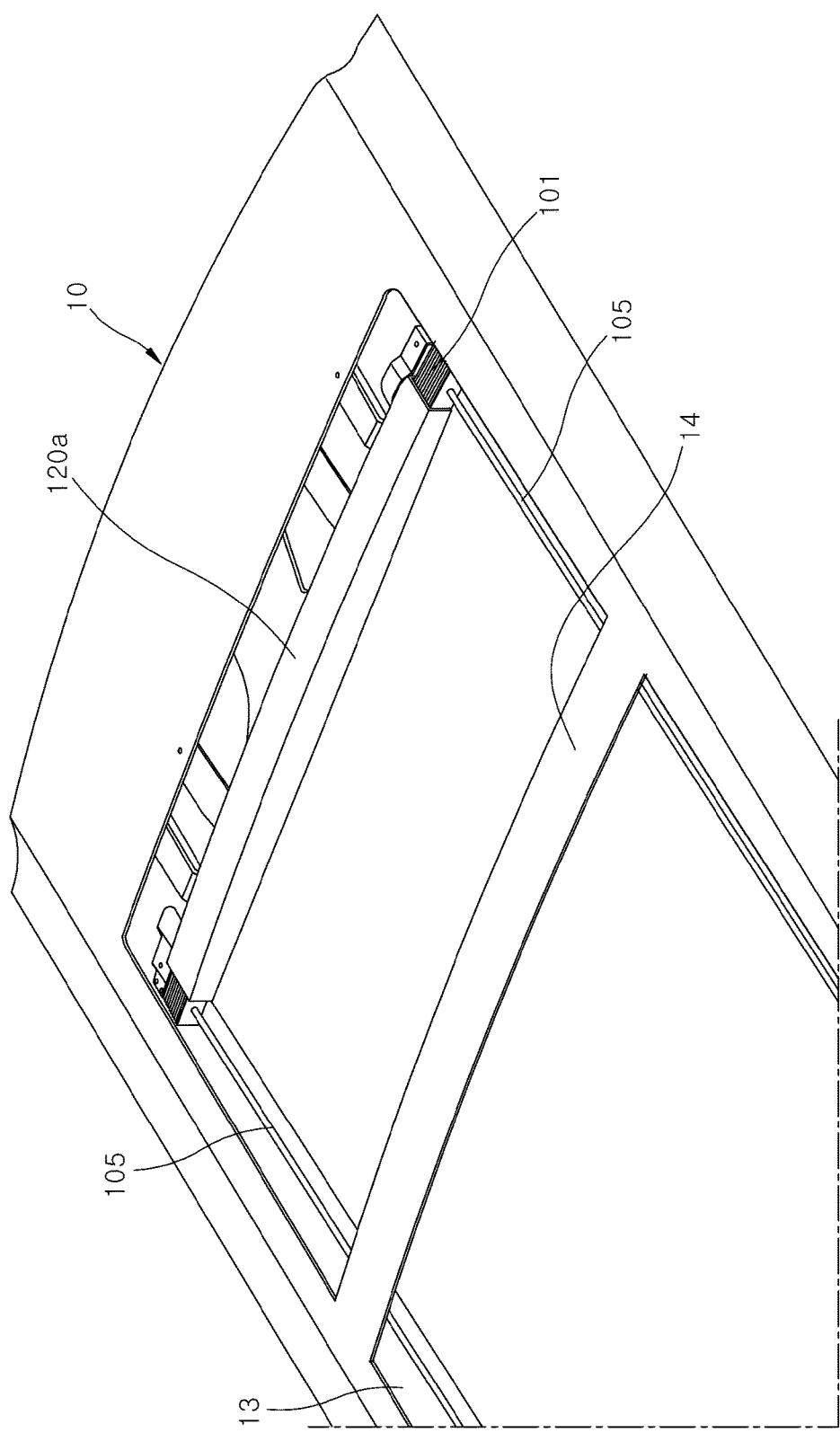
FIG. 1 is a perspective view illustrating a roof airbag apparatus installed in a panorama roof of a vehicle according to an exemplary embodiment of the invention.
Figure 2:
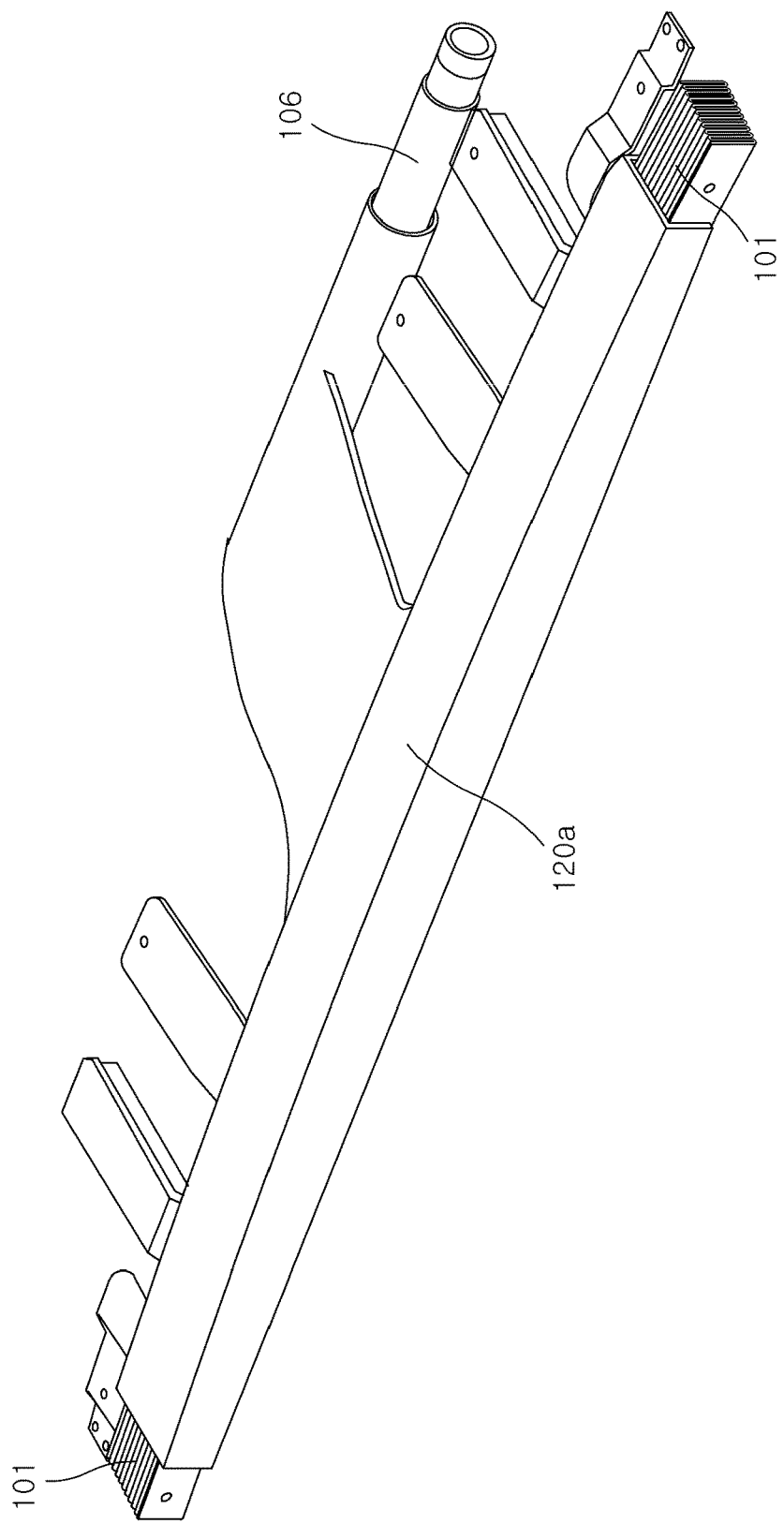
FIG. 2 is a larger perspective view illustrating the roof airbag apparatus shown in FIG. 1.
Figure 3:
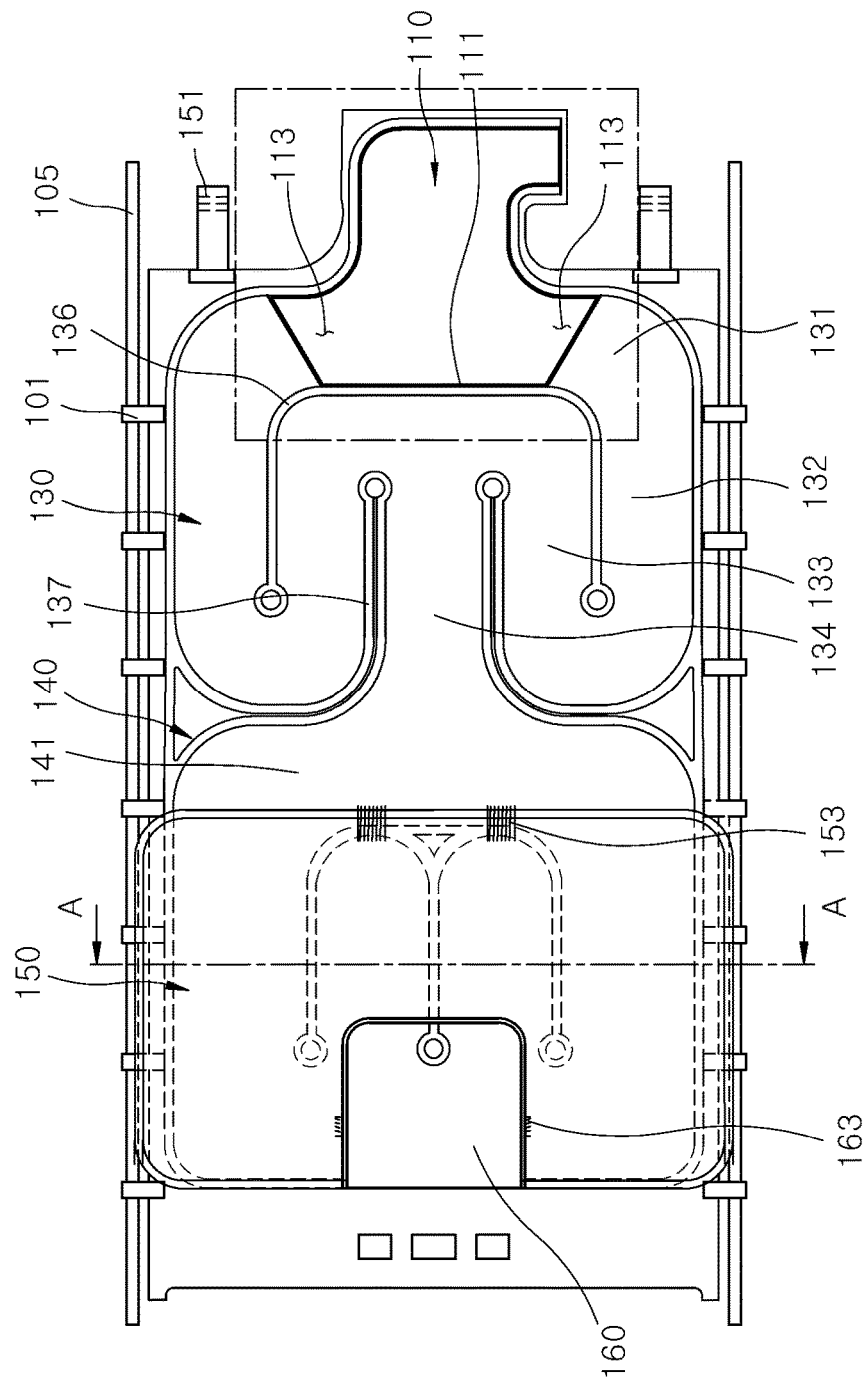
FIG. 3 is a plan view illustrating the roof airbag apparatus of an exemplary embodiment when deployed by gas.
Figure 4:
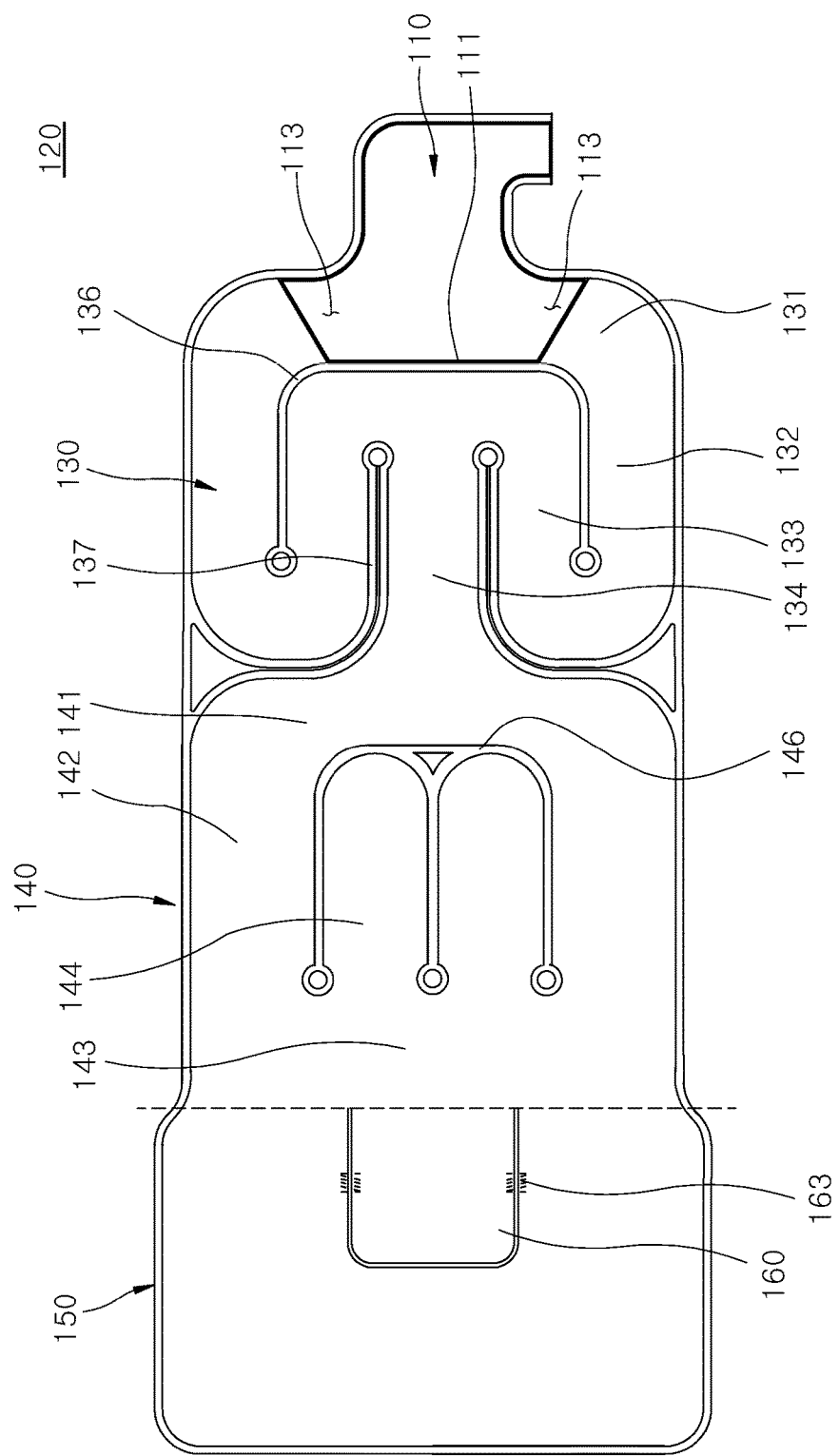
FIG. 4 is a plan view illustrating an airbag cushion part in an unfolded state in the roof airbag apparatus in accordance with an exemplary embodiment.
Figure 5:
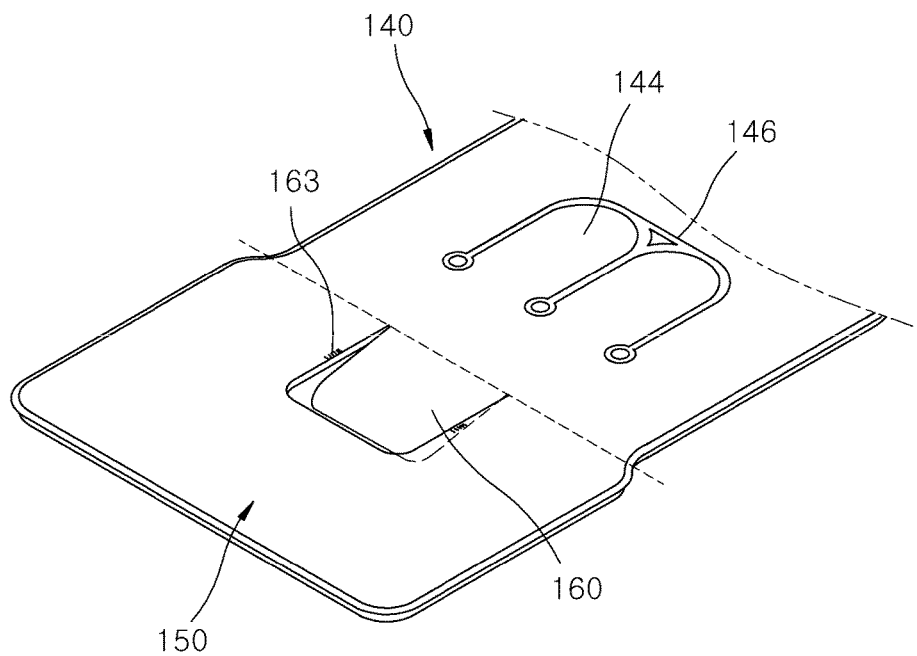
FIG. 5 is a perspective view illustrating the shape of a support chamber in the roof airbag apparatus in accordance with an exemplary embodiment.
Figure 6:
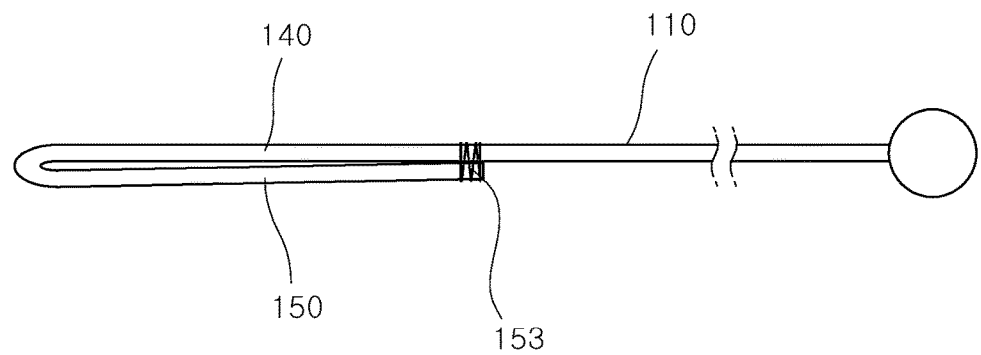
FIG. 6 is a side view illustrating a trailing deployment part and an overlap deployment part are fixed by a first sewed part in the roof airbag apparatus in accordance with an exemplary embodiment.
Figure 7:
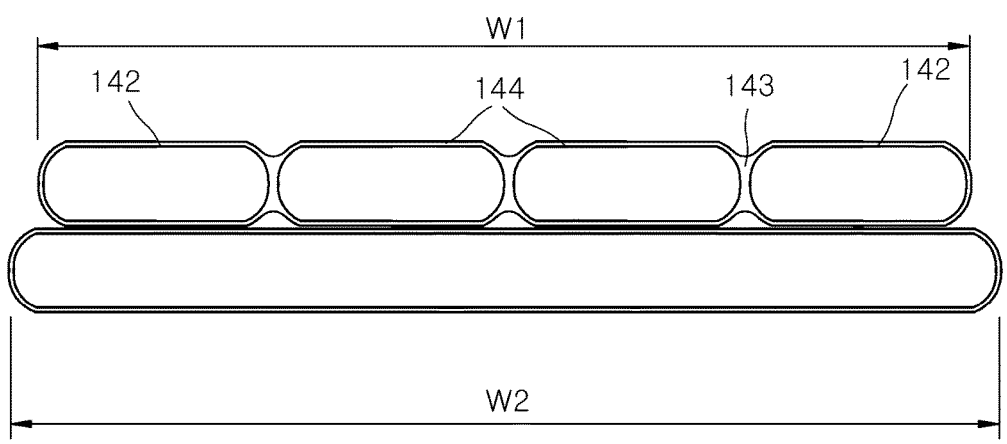
FIG. 7 is a cross-sectional view illustrating an overlap of the trailing deployment part and the overlap deployment part overlap with each other in the curtain airbag apparatus in accordance with an exemplary embodiment.
Figure 8A:
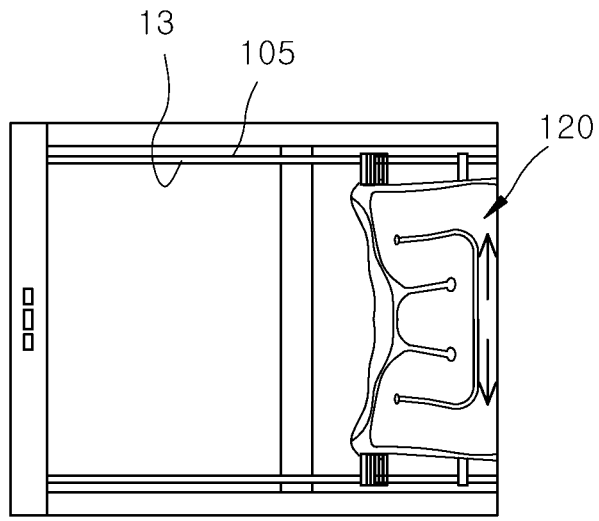
FIGS. 8A, 8B, 8C, 8D, 8E, and 8F illustrate a process in which the airbag cushion part is deployed in the roof airbag apparatus in accordance with an exemplary embodiment.
Figure 8B:
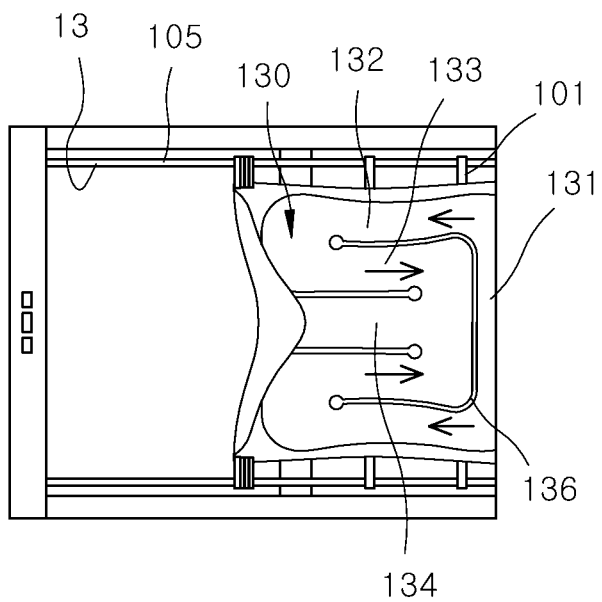
Figure 8C:
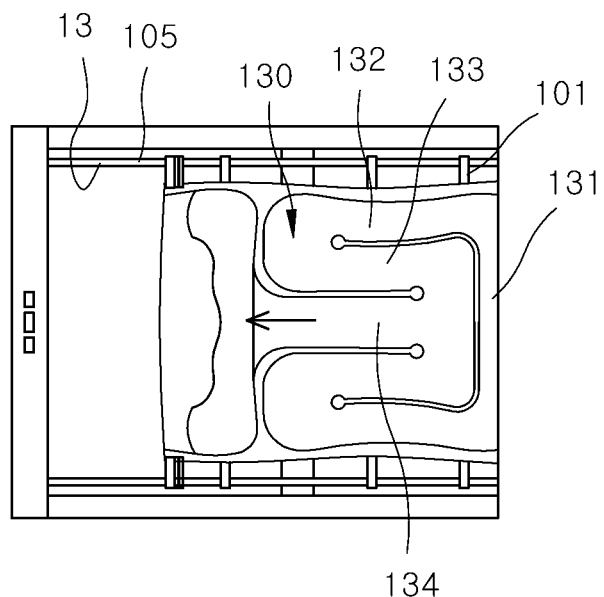
Figure 8D:
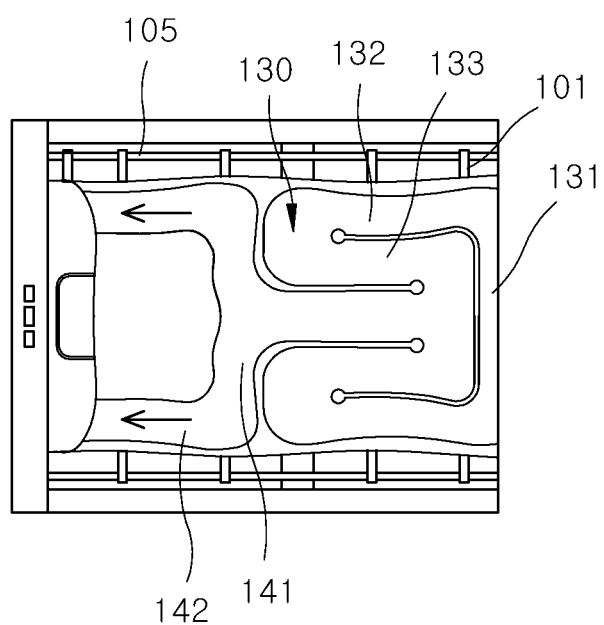
Figure 8E:
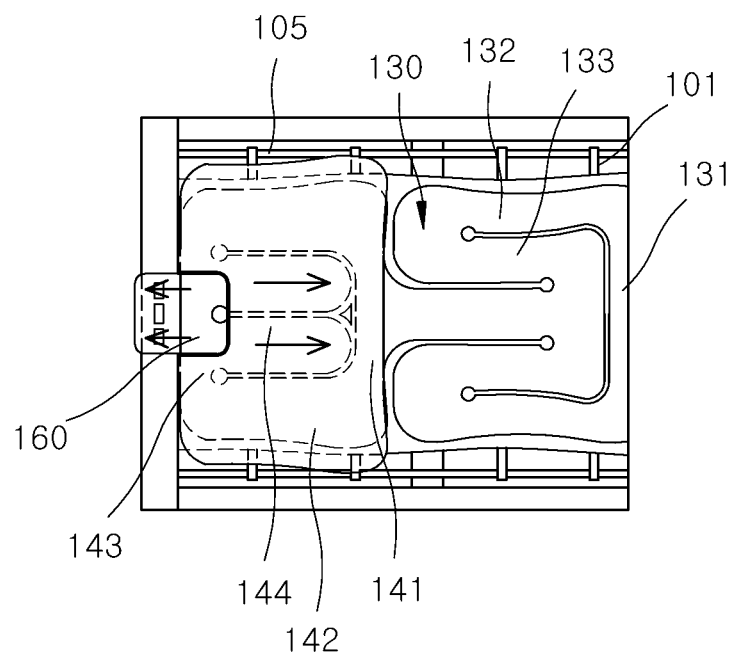
Figure 8F:
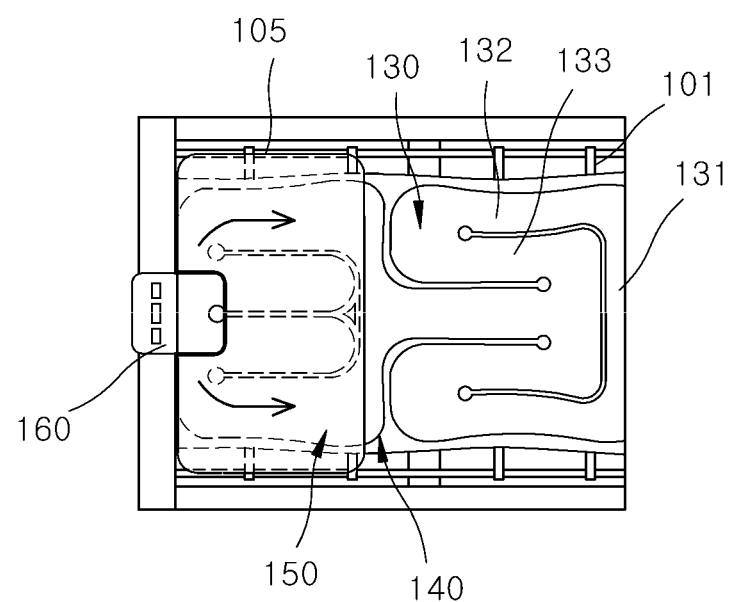

FIG. 1 is a perspective view illustrating that a roof airbag apparatus in accordance with an embodiment of the present invention is installed in a panorama roof, FIG. 2 is a perspective view illustrating the roof airbag apparatus in accordance with the embodiment of the present invention, FIG. 3 is a plan view illustrating that the roof airbag apparatus in accordance with the embodiment of the present invention is deployed by gas, FIG. 4 is a plan view illustrating that an airbag cushion part is unfolded in the roof airbag apparatus in accordance with the embodiment of the present invention, FIG. 5 is a perspective view illustrating the shape of a support chamber in the roof airbag apparatus in accordance with the embodiment of the present invention, FIG. 6 is a side view illustrating a trailing deployment part and an overlap deployment part are fixed by a first sewed part in the roof airbag apparatus in accordance with the embodiment of the present invention, and FIG. 7 is a cross-sectional view illustrating that the trailing deployment part and the overlap deployment part overlap each other in the curtain airbag apparatus in accordance with the embodiment of the present invention.

Referring to FIGS. 1 to 7, the roof airbag apparatus in accordance with the embodiment of the present invention may include a leading deployment part 130, a trailing deployment part 140 and an overlap deployment part 150.

A vehicle may have a panorama roof 10 installed at the ceiling thereof. The roof airbag apparatus may be installed in the panorama roof 10. The panorama roof 10 may have an inflator 106 installed at one side thereof. The panorama roof 10 may have guide parts 105 installed at both sides thereof along the front-to-rear direction of the vehicle body. The guide parts 105 may include wires arranged in parallel to each other at both sides of the panorama roof 10. The panorama roof 10 may have a headliner 13 installed along the edges thereof.

An airbag cushion part 120 may be connected to the inflator 106, and folded and disposed in the panorama roof 10. That is, the airbag cushion part 120 may be folded in a zigzag shape, and a cover 120a may be installed so as to cover the folded airbag cushion part 120.

The airbag cushion part 120 may have a plurality of connection tabs 101 installed at both sides thereof, and the plurality of connection tabs 101 may be movably installed on the guide parts 105. When the airbag cushion part 120 is folded and disposed at one side of the panorama roof 10, the plurality of connection tabs 101 overlap each other in a line on the guide parts 105. When the airbag cushion part 120 is deployed, the connection tabs 101 may support both sides of the airbag cushion part 120 while being moved along the guide parts 105.

A diffuser 110 may be disposed in the airbag cushion part 120. The diffuser 110 may include a barrier wall 111 and gas discharge parts 113. The barrier wall 111 may be formed in the central portion of the airbag cushion part 120 in order to prevent gas from being injected toward the widthwise central portion of the airbag cushion part 120. The gas discharge parts 113 may be connected to the barrier wall 111, and form a flow path which diverges into two parts toward the guide parts 105 installed at the left and right sides. That is, the gas discharge parts 113 may be symmetrically formed based on the front-to-rear direction of the vehicle.

Therefore, the diffuser 110 may deploy the airbag cushion part 120 toward both sides of the vehicle in the widthwise direction. When the airbag cushion part 120 is initially deployed, the diffuser 110 may not inject gas toward the rear of the vehicle, but inject gas in a direction substantially perpendicular to the rear of the vehicle. That is, the gas may be symmetrically injected toward the left and right sides. Therefore, since the airbag cushion part 120 can be prevented from being asymmetrically expanded and deployed, the airbag cushion part 120 can be deployed without being locked to a center pillar 14.

The gas discharge part 113 of the diffuser 110 may be formed in an inclined shape when being extended toward the guide part 105. Since the flow direction of the gas supplied into the airbag cushion part 120 is smoothly turned over to the guide parts 105 along the gas discharge parts 113, the airbag cushion part 120 can be easily unfolded and deployed toward both sides of the vehicle in the widthwise direction, when the airbag cushion part 120 is initially deployed.

The airbag cushion part 120 may include a leading deployment part 130, a trailing deployment part 140 and an overlap deployment part 150. In the airbag cushion part 120, the trailing deployment part 140 may be deployed after the leading deployment part 130 is deployed.

The leading deployment part 130 may include a pair of first chambers 131, a pair of second chambers 132, a pair of third chambers 133 and a fourth chamber 134.

The leading deployment part 130 may be connected to the diffuser 110. The leading deployment part 130 may include the first to fourth chambers 131 to 134.

The diffuser 110 may be disposed in the first chambers 131. The first chambers 131 may be deployed toward both sides of the panorama roof 10 in the widthwise direction. In other words, the first chambers 131 may be deployed in a direction substantially perpendicular to the rear of the vehicle by the barrier wall 111 and the gas discharge part 113. That is, the first chambers 131 may be symmetrically deployed toward the guide parts 105.

Since the first chambers 131 are deployed in parallel to the widthwise direction of the panorama roof 10, the leading deployment part 130 can be symmetrically deployed in the widthwise direction of the vehicle when the leading deployment part 130 is initially deployed.

The second chambers 132 may be connected to the first chambers 131, respectively, and deployed toward the rear of the vehicle from the first chambers 131. The second chambers 132 may form the outermost parts of the airbag cushion part 120, while being deployed almost vertically to the first chambers 131. The connection tabs 101 may be installed outside the second chambers 132. When the second chambers 132 are expanded and deployed, the second chambers 132 can be easily deployed along the guide parts 105 by the connection tabs 101. At this time, the left and right second chambers 132 forming the left and right ends of the airbag cushion part 120 may be deployed at the same speed or different speeds.

The third chambers 133 may be connected to the second chambers 132, respectively, and deployed in the opposite direction of the second chambers 132 or toward the front of the vehicle. The third chambers 133 may be disposed inside the second chambers 132. While the flow direction of the gas is turned over from the second chamber 132 to the third chamber 133, the deployment of the leading deployment part 130 in the longitudinal direction or the front-to-rear direction of the vehicle may be temporarily stopped.

The fourth chamber 134 may be connected to the third chambers 133, and deployed in the opposite direction of the third chambers 133 or toward the rear of the vehicle. The fourth chamber 134 may be disposed between the pair of third chambers 133. As the fourth chamber 134 is expanded and deployed, the widthwise central portion of the leading deployment part 130 may be expanded.

The first to fourth chambers 131 to 134 constituting the leading deployment part 130 may be sequentially expanded and deployed. At this time, the outer portion of the leading deployment part 130 may be first deployed as the first and second chambers 131 and 132 are expanded, and the inner portion of the leading deployment part 130 may be then expanded as the third and fourth chambers 133 and 134 are expanded.

While the flow direction of the gas is turned over from the second chamber 132 to the third chamber 133, the longitudinal deployment of the leading deployment part 130 may be temporarily stopped. Therefore, since the widthwise central portion of the leading deployment part 130 is expanded after the leading end of the leading deployment part 130 reaches the center pillar 14, the leading end of the leading deployment part 130 may be expanded in parallel to the widthwise direction of the leading deployment part 130, and then pass the center pillar 14. Therefore, the leading end of the leading deployment part 130 can be deployed without being locked to the center pillar 14.

The airbag cushion part 120 may have a first seam part 136 for dividing the airbag cushion part 120 into the first to third chambers 131 to 133. The first seam part 136 may be formed in a U-shape, the central portion of the first seam part 136 may be disposed in parallel to the barrier wall 111, and both ends of the first seam part 136, bent and extended from the central portion, divide the second chambers 132 and the third chambers 133 into the inside and outside of the vehicle in the widthwise direction. Since the first seam part 136 is disposed in parallel to the barrier wall 111, gas discharged through the gas discharge part 113 may deploy the first chamber 131 in the widthwise direction of the vehicle.

Since the first seam part 136 divides the second chamber 132 and the third chamber 133 in the front-to-rear direction of the vehicle, the flow direction of the gas may be turned over while the gas flows from the second chamber 132 toward the third chamber 133. While the flow direction of the gas is turned over at the connection between the second and third chambers 132 and 133, the leading end of the leading deployment part 130 may not be deployed in the longitudinal direction of the airbag cushion part 120.

The airbag cushion part 120 may have a pair of L-shaped second seam parts 137 formed therein, such that the flow directions of the gas in the second and third chambers 132 and 133 are turned over. Therefore, while the flow direction of the gas is turned over at the connection between the second and third chambers 132 and 133, the leading end of the leading deployment part 130 may not be deployed in the longitudinal direction of the airbag cushion part 120. Therefore, the leading end of the leading deployment part 130 or a folded portion of the trailing deployment part 140 can be prevented from being locked to the center pillar 14.

Therefore, after the gas deploys the second chamber 132, the flow direction of the gas may be turned over to deploy the third chamber 133 disposed inside the second chamber 132. That is, the flow direction of the gas may be turned over while the gas flows from the second chamber 132 to the third chamber 133. While the flow direction of the gas is turned over at the connection between the second and third chambers 132 and 133, the leading end of the leading deployment part 130 may not be deployed in the longitudinal direction of the airbag cushion part 120.

The trailing deployment part 140 may include fifth to eighth chambers 141 to 144.

The fifth chamber 141 may be connected to the fourth chamber 134, and deployed toward both sides of the vehicle in the widthwise direction. Thus, the fifth chamber 141 may be disposed in parallel to the first chamber 131 of the leading deployment part 130.

The sixth chamber 142 may be connected to the fifth chamber 141, and deployed toward the rear of the vehicle from the fifth chamber 141. The sixth chamber 142 may form the outermost part of the airbag cushion part 120, while being deployed almost vertically to the fifth chamber 141. The connection tabs 101 may be installed outside the sixth chamber 142. Since the sixth chamber 142 is deployed toward the rear of the vehicle, the sixth chamber 142 may be easily expanded and deployed along the guide part 105. At this time, the left and right sixth chambers 142 forming the left and right ends of the airbag cushion part 120 may be deployed at the same speed or different speeds.

The seventh chamber 143 may be connected to the sixth chamber 142, and deployed in the opposite direction of the fifth chamber 141. That is, while the fifth chamber 141 is deployed in a direction spreading toward outside, the seventh chamber 143 may be deployed in a direction converging to the inside. After the deployment, the seventh chamber 143 may be disposed in parallel to the fifth chamber 141 and the first chamber 131, and communicate with a support chamber 160.

The eighth chamber 144 may be connected to the seventh chamber 143, deployed toward the front of the vehicle or the diffuser 110, and disposed inside the sixth chamber 142. The eighth chamber 144 may diverge into a plurality of parts from the seventh chamber 143 toward the front of the vehicle. The fifth to eighth chambers 141 to 144 constituting the trailing deployment part 140 may be sequentially expanded and deployed. Furthermore, since the eighth chamber 144 and the support chamber 160 communicate with the seventh chamber 143, the eighth chamber 144 and the support chamber 160 may be expanded and deployed at the same time.

The trailing deployment part 140 may have a third seam part 146 to limit the expansion thickness of the trailing deployment part 140. Since the third seam part 146 limits the expansion thickness of the trailing deployment part 140, the third seam part 146 may reduce the amount of gas stored in the airbag cushion part 120, such that the airbag cushion part 120 can be tightly expanded by the gas.

The third seam part 146 may guide the gas discharge path of the fourth chamber 134, and have an E-shaped structure to divide the sixth chamber 142 and the eighth chamber 144. The eighth chamber 144 may be divided into a plurality of regions by the third seam part 146.

After the fifth to seventh chambers 141 to 143 arranged at the edges of the trailing deployment part 140 are deployed, the eighth chamber 144 positioned in the trailing deployment part 140 may be deployed. Therefore, since the eighth chamber 144 is deployed after the connection tabs 101 are moved along the guide part 105 through the deployment of the sixth chamber 142, the trailing deployment part 140 may be smoothly deployed.

The overlap deployment part 150 may be connected to the trailing deployment part 140, overlapped by the trailing deployment part 140, and deployed after the trailing deployment part 140 is deployed. The overlap deployment part 150 may be formed in a rectangular shape to cover the trailing deployment part 140. Since the overlap deployment part 150 and the trailing deployment part 140 overlap each other to form a double cushion part, the overlap deployment part 150 may absorb an internal shock of the vehicle, and the trailing deployment part 140 may elastically support the overlap deployment part 150. Therefore, although the head of a passenger collides with the overlap deployment part 150 in case of a roll over of the vehicle, the bending deformation L of the overlap deployment part 150 and the trailing deployment part 140 can be reduced (refer to FIG. 9), which makes it possible to reduce the ejection of the passenger.

The overlap deployment part 150 may be fixed to the trailing deployment part 140 by a first sewed part 153. At this time, the first sewed part 153 may constrain the third seam part 146 of the trailing deployment part 140 and the leading end of the overlap deployment part 150. The first sewed part 153 may not be torn even after the trailing deployment part 140 and the overlap deployment part 150 are completely deployed.

The width W2 of the overlap deployment part 150 may be set to a larger value than the width W1 of the trailing deployment part 140, such that the overlap deployment part 150 covers both sides of the headliner 13. Since the overlap deployment part 150 is deployed to cover both sides of the headliner 13, the head of the passenger can be prevented from directly colliding with the headliner 13.

The roof airbag apparatus may further include a support chamber 160 which is connected to the trailing deployment part 140, formed inside the overlap deployment part 150 so as to be separated from the overlap deployment part 150, and deployed toward the rear of the vehicle or the opposite side of the diffuser 110.

The overlap deployment part 150 may be formed in a U-shape such that both sides thereof in the widthwise direction are connected to the trailing deployment part 140, and the support chamber 160 may be disposed in the center of the overlap deployment part 150 and formed in a rectangular shape.

The support chamber 160 may not communicate with the overlap deployment part 150, but communicate with the trailing deployment part 140. Since the support chamber 160 is formed separately from the overlap deployment part 150, the support chamber 160 may be separated from the overlap deployment part 150 when the support chamber 160 is expanded. Then, the support chamber 160 may be deployed toward the opposite side of the diffuser 110, and disposed in parallel to the trailing deployment part 140. Since the support chamber 160 is deployed to come in contact with the ceiling of the vehicle, a position variation of the trailing deployment part 140 can be suppressed.

The support chamber 160 may be deployed to cover the rear of the headliner 13 of the vehicle. Therefore, in case of a roll over of the vehicle, the head of the passenger can be prevented from colliding with the headliner 13.

The support chamber 160 may be fixed to the overlap deployment part 150 by a second sewed part 163. The second sewed part 163 may be torn by an expansion force of the support chamber 160 when the support chamber 160 is deployed. The second sewed part 163 may be omitted from the support chamber 160.

The deployment process of the roof airbag apparatus in accordance with the embodiment of the present invention will be described.

Figure 9:
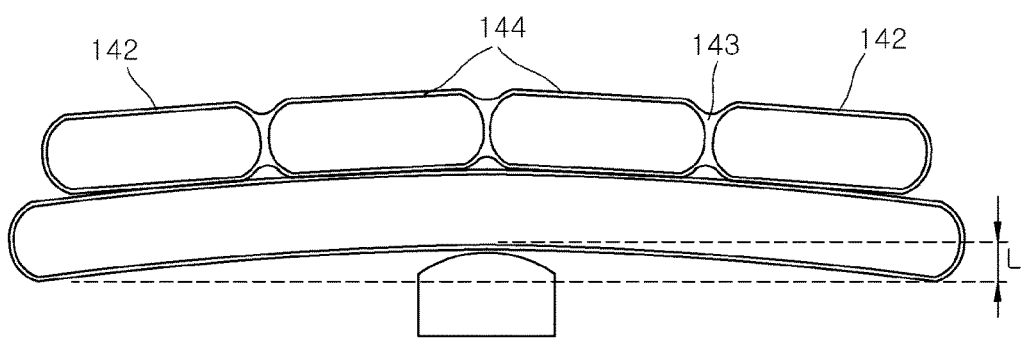
FIG. 9 is a cross-sectional view illustrating a state in which the airbag cushion part of the roof airbag apparatus of an exemplary embodiment is bent when an impact of the head of a passenger is applied to the airbag cushion part.

FIGS. 8A to 8F illustrate a process in which the airbag cushion part is deployed in the roof airbag apparatus in accordance with the embodiment of the present invention, and FIG. 9 is a cross-sectional view illustrating that the airbag cushion part of the roof airbag apparatus in accordance with the embodiment of the present invention is bent when an impact of the head is applied to the airbag cushion part.

Referring to FIGS. 8A to 8F and FIG. 9, when the inflator 106 is driven in case of a roll over of the vehicle, gas of the inflator 106 may be injected into the diffuser 110. As the gas of the diffuser 110 is introduced into the first chamber 131, the first chamber 131 may be expanded and deployed in the widthwise direction of the vehicle or the panorama roof 10. At this time, since the first seam part 136 and the barrier wall 111 are installed at the rear of the vehicle, the first chamber 131 may also be deployed in the widthwise direction of the vehicle while the gas in the diffuser 110 is supplied along the gas discharge part 113.

As the gas of the first chamber 131 flows to the second chamber 132, the second chamber 132 may be expanded and deployed. At this time, while the second chamber 132 is deployed, the connection tabs 101 may be moved along the guide part 105. The second chamber 132 may be deployed toward the rear of the vehicle.

While the flow direction of the gas is turned over at the connection between the second and third chambers 132 and 133, the leading end of the leading deployment part 130 may not be deployed in the longitudinal direction of the airbag cushion part 120. Then, since the third and fourth chambers 133 and 134 disposed inside the second chamber 132 are expanded, the trailing deployment part 140 may be expanded after the leading end of the leading deployment part 130 is completely expanded. Therefore, the leading end of the leading deployment part 130 or the folded portion of the trailing deployment part 140 can be prevented from being locked to the center pillar 14.

As the gas is introduced into the fifth chamber 141, the trailing deployment part 140 may be deployed along the widthwise direction of the airbag cushion part 120. As the gas is introduced into the sixth chamber 142, the trailing deployment part 140 may be deployed so that both sides thereof are parallel to the guide part 105. After the sixth chamber 142 is deployed, the seventh chamber 143 may be expanded in parallel to the widthwise direction of the vehicle so as to converge to the inside.

Since the eighth chamber 144 may be deployed in the trailing deployment part 140 after the fifth to seventh chambers 141 to 143 arranged at the edges of the trailing deployment part 140 are deployed, both sides of the trailing deployment part 140 may be symmetrically deployed.

Since the eighth chamber 144 and the support chamber 160 communicate with the seventh chamber 143, the eighth chamber 144 and the support chamber 160 may be expanded and deployed at the same time. Since the support chamber 160 is completely deployed to cover the headliner 13, the support chamber 160 can prevent the head of the passenger from colliding with the headliner 13 in case of a roll over of the vehicle.

After the trailing deployment part 140 is deployed, the overlap deployment part 150 may be deployed. At this time, since the overlap deployment part 150 is fixed to the trailing deployment part 140 by the first sewed part 153, the overlap deployment part 150 may be deployed while overlapping the trailing deployment part 140. Since the overlap deployment part 150 and the trailing deployment part 140 are expanded and deployed while overlapping each other, the bending deformations L of the overlap deployment part 150 and the trailing deployment part 140 can be reduced when the head of the passenger collides with the overlap deployment part 150. Therefore, the passenger can be prevented from being ejected toward the door of the vehicle, while the ejection amount of the passenger is reduced.

In accordance with the embodiment of the present invention, since the overlap deployment part and the trailing deployment part overlap each other to form a double cushion part, bending deformations of the overlap deployment part and the trailing deployment part can be reduced when the head of a passenger collides with the overlap deployment part.

Furthermore, since the support chamber is deployed to cover the rear of the headliner of the vehicle, the head of the passenger can be prevented from colliding with the headliner in case of a roll over of the vehicle.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A roof airbag apparatus comprising:
a leading deployment part connected to a diffuser;
a trailing deployment part connected to the leading deployment part, and configured to be deployed with a time difference from deployment of the leading deployment part; and
an overlap deployment part connected to the trailing deployment part, overlapped by the trailing deployment part, and configured to be deployed with a time difference from deployment of the trailing deployment part.

2. The roof airbag apparatus of claim 1, wherein the overlap deployment part is fixed to the trailing deployment part through a first sewed part.

3. The roof airbag apparatus of claim 2, wherein the overlap deployment part has a greater width than that of the trailing deployment part, in order to cover both sides of a headliner of a vehicle.

4. The roof airbag apparatus of claim 1, further comprising a support chamber connected to the trailing deployment part, formed inside the overlap deployment part so as to be separated from the overlap deployment part, and configured to be deployed toward the opposite side of the diffuser.

5. The roof airbag apparatus of claim 4, wherein the support chamber communicates with the trailing deployment part and does not communicate with the overlap deployment part.

6. The roof airbag apparatus of claim 4, wherein the support chamber is deployed to cover a headliner of a vehicle.

7. The roof airbag apparatus of claim 6, wherein:
the support chamber is fixed to the overlap deployment part through a second sewed part; and
the second sewed part is configured to be torn by an expansion force of the support chamber when the support chamber is deployed.

8. The roof airbag apparatus of claim 4, wherein the leading deployment part comprises:
first chambers coupled to the diffuser, and configured to be deployed toward both sides of the leading deployment part in the widthwise direction;
second chambers disposed at both sides of the leading deployment part in the widthwise direction, and configured to be deployed from the first chamber toward the opposite side of the diffuser;
third chambers disposed inside the second chambers, and configured to be deployed from the second chambers toward the diffuser; and
a fourth chamber disposed between the third chambers, and configured to be deployed from the third chambers toward the opposite side of the diffuser.

9. The roof airbag apparatus of claim 8, wherein the trailing deployment part comprises:
fifth chambers disposed at both sides of the trailing deployment part in the widthwise direction, and configured to be deployed from the fourth chamber toward both sides of the trailing deployment part in the widthwise direction;
sixth chambers configured to be deployed from the fifth chambers toward the opposite side of the diffuser;
a seventh chamber connected to the sixth chambers, disposed at the leading end of the trailing deployment part so as to be parallel to the widthwise direction of the trailing deployment part, and communicating with the support chamber; and
an eighth chamber disposed inside the sixth chambers, and configured to be deployed from the seventh chamber toward the diffuser.

10. The roof airbag apparatus of claim 1, wherein the diffuser comprises:
a barrier wall disposed at the rear of the vehicle and configured to block gas from flowing toward the rear of the vehicle, the gas being supplied from the inflator; and
gas discharge parts connected to both sides of the barrier wall, and extended in the widthwise direction of the vehicle so as to constitute a flow path of the gas.

* * * * *